United States Patent
Baugh

(10) Patent No.: US 9,689,215 B2
(45) Date of Patent: Jun. 27, 2017

(54) SELF-ADJUSTING REEL ASSEMBLY APPARATUS, SYSTEM AND METHOD

(71) Applicant: Benton Frederick Baugh, Houston, TX (US)

(72) Inventor: Benton Frederick Baugh, Houston, TX (US)

(73) Assignee: REEL POWER LICENSING CORP., Oklahoma City, OK (US)

( * ) Notice: Subject to any disclaimer, the term of this patent is extended or adjusted under 35 U.S.C. 154(b) by 0 days.

(21) Appl. No.: 15/177,603

(22) Filed: Jun. 9, 2016

(65) Prior Publication Data

US 2016/0362948 A1    Dec. 15, 2016

Related U.S. Application Data

(60) Provisional application No. 62/174,348, filed on Jun. 11, 2015, provisional application No. 62/174,363, filed on Jun. 11, 2015, provisional application No. 62/174,368, filed on Jun. 11, 2015.

(51) Int. Cl.

| | |
|---|---|
| *E21B 17/01* | (2006.01) |
| *E21B 19/22* | (2006.01) |
| *E21B 19/00* | (2006.01) |
| *E21B 19/02* | (2006.01) |
| *G01P 13/02* | (2006.01) |
| *G05B 15/02* | (2006.01) |
| *F16D 65/092* | (2006.01) |
| *F16D 7/02* | (2006.01) |

(52) U.S. Cl.
CPC ............ *E21B 19/006* (2013.01); *E21B 17/01* (2013.01); *E21B 19/008* (2013.01); *E21B 19/02* (2013.01); *E21B 19/22* (2013.01); *F16D 65/092* (2013.01); *G01P 13/02* (2013.01); *G05B 15/02* (2013.01); *F16D 7/02* (2013.01)

(58) Field of Classification Search
CPC ........ E21B 17/01; E21B 19/006; E21B 19/02; E21B 19/22; G01P 13/02; G05B 15/02; F16D 7/02

See application file for complete search history.

(56) References Cited

U.S. PATENT DOCUMENTS

| | | | | |
|---|---|---|---|---|
| 3,481,584 | A | * 12/1969 | Robertson | B66D 1/08 |
| | | | | 254/268 |
| 5,373,925 | A | * 12/1994 | Handford | B63C 11/18 |
| | | | | 114/315 |
| 5,950,953 | A | 9/1999 | Baugh et al. | |
| 6,216,789 | B1 | * 4/2001 | Lorsignol | B66D 1/505 |
| | | | | 166/355 |
| 7,363,968 | B1 | * 4/2008 | Baugh | E21B 19/22 |
| | | | | 166/355 |
| 7,967,234 | B2 | * 6/2011 | Baugh | E21B 19/22 |
| | | | | 166/355 |
| 8,352,210 | B2 | * 1/2013 | Kranz | G01C 22/02 |
| | | | | 702/141 |

(Continued)

FOREIGN PATENT DOCUMENTS

WO    2009032601 A1    3/2009

*Primary Examiner* — Matthew R Buck
(74) *Attorney, Agent, or Firm* — Phillips Murrah PC; Martin G. Ozinga

(57) ABSTRACT

The present invention is a computer controlled reel apparatus, system and method of using same that may generally maintain constant tension on a reel umbilical.

3 Claims, 8 Drawing Sheets

(56) References Cited

U.S. PATENT DOCUMENTS

| | | |
|---|---|---|
| 2006/0000936 A1 | 1/2006 | Caamano et al. |
| 2007/0152093 A1 | 7/2007 | Hartzheim |
| 2011/0006149 A1* | 1/2011 | Baugh .................. B65H 59/043 242/420.5 |
| 2011/0006150 A1 | 1/2011 | Baugh |
| 2011/0198431 A1* | 8/2011 | Baugh .................... B65H 63/08 242/422.2 |
| 2015/0083843 A1 | 3/2015 | Rekieta et al. |

* cited by examiner

SELF-ADJUSTING REEL ASSEMBLY APPARATUS, SYSTEM AND METHOD

CROSS-REFERENCE TO RELATED APPLICATIONS

Priority is claimed from U.S. Provisional Application Ser. Nos. 62/174,348, 62/174,363, and 62/174,368 all filed on Jun. 11, 2015, and incorporated by reference herein.

BACKGROUND OF INVENTION

1. Field of the Invention

In general, the present invention relates to an apparatus, system and method for a self-adjusting computer controlled reel assembly. More particularly, the present invention provides a new and improved reel assembly that may maintain a constant tension and constant slippage setting on the umbilical of an offshore reel as the radius to the umbilical varies and the deployment direction is reversed.

2. Description of the Prior Art

When subsea blowout preventer stacks are lowered to the seafloor to facilitate the drilling of oil and gas wells, they are lowered on a drilling riser, which has a long conduit with an inner diameter typically about nineteen inches, which acts as the main conduit for the drilling operations. On the outside of this conduit will be flotation material to make it lighter in water, high pressure circulation lines called choke and kill lines, and control umbilicals. The control umbilicals can be hydraulic, electrical, fiber optic, or a combination of these.

The umbilicals are clamped to the high pressure lines on the riser such that the drilling riser carries the weight of the deployed lines. The umbilicals are handled at the surface by reels, which must payout the umbilical when the drilling riser is lowered and rewind the umbilical when the drilling riser is retrieved. Umbilicals may be hoses, wire rope, cable, hoses, fiber optics, electrical, or combinations of these.

A first level of control of these reels was to have a valve controlling a motor on the reels and simply keep up with the movement of the drilling riser. This was made practical with a "service loop" which sent the umbilicals over a first sheave, down a loose loop, back up over a second sheave, and then clamped to the riser.

A next level of control was to simply use an air throttle and put the umbilical in tension at all times. When the drilling riser is lowered, it pulls the motor against the pneumatic supply and pumps air back into the air system, somewhat like regeneration, or dumped the generated air across a relief valve. Dumping the generated air is more workable as the pneumatic supply is likely of too high a pressure to pump back into. As the radius to the umbilical being deployed from a full spool to an empty spool can vary by as much as 3/1, an umbilical tension of 1,000 lbs. at the outer wrap will translate into 3,000 lbs. at the inner wrap. This means that you must have personnel monitoring the reel to keep the tension down with a reasonable range. Furthermore, you have a slip clutch to prevent high tension if a drilling riser is lowered when the brakes are set on the reel; a slip clutch setting of 1,500 lbs. at the outer wrap becomes a slip clutch setting of 4,500 lbs. at the inner wrap.

What this means is that in all these cases, personnel must be committed to monitor and control the umbilical tension at all times during the running operations. This added head count in a space constrained expensive offshore rig is required at the critical time when the blowout preventer stack and drilling riser is run and personnel commitment is at the maximum.

Even with the added personnel commitment to monitor and control the umbilical tension, no solution has been available for this high safety slippage setting when the umbilical is being paid off from the inner wraps. With the long studies of trying to reduce personnel requirements on these offshore rigs, there has been no solution offered for these problems.

Prior art attempts at improvements to this problem have obviously not provided the desired solutions. Thus, there is a need for an apparatus, process and or system that provides a self-adjusting intelligent reel assembly for reels. The above discussed limitations in the prior art is not exhaustive. The current invention provides an inexpensive, time saving, more reliable apparatus, method and system for reels where the prior art fails.

SUMMARY OF THE INVENTION

In view of the foregoing disadvantages inherent in the known types of reels utilized with offshore applications now present in the prior art, the present invention provides a new and improved reel apparatus, system and method of using same. As such, the general purpose of the present invention, which will be described subsequently in greater detail, is to provide a new and improved reel, which has all the advantages of the prior art devices and none and or fewer of the disadvantages.

It is, therefore, contemplated that the present invention is an apparatus, system and method of automatically maintaining a relatively constant tension and a relatively constant slippage load on an umbilical which is deployed from a spool on a reel by being clamped to a subsea drilling riser comprising a frame having an axle; a spool having flanges and a drum wherein said spool is mounted on said axle and adapted to hold said offshore umbilical; a motor in communication with said spool and adapted to rotate said spool; a tensioning device adapted to automatically maintain a relatively constant tension and a relatively constant slippage load on said umbilical when deployed from said spool; and a processing computer in communication with said tensioning device and said motor wherein said processing computer is adapted to compute said relative constant tension and said relative constant slippage and control said motor.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved reel apparatus, system and method of utilizing same that may provide an automatically controlling of the tension of a deepwater umbilical as a blowout preventer stack is lowered on a drilling riser and the radius to the umbilical changes.

Furthermore, an object of the present invention is to provide a new and improved reel apparatus, system and method of utilizing same to provide an automatically controlling of the spool slippage setting of a deepwater umbilical as a blowout preventer stack is lowered on a drilling riser and the radius to the umbilical changes.

Another object of the present invention is to provide a new and improved reel apparatus, system, and method of utilizing same to provide a method of intrinsically safely automatically controlling the tension of a deepwater umbilical as a blowout preventer stack is lowered on a drilling riser and the radius to the umbilical changes.

Yet another object of the present invention is to provide a new and improved reel apparatus, system and method of utilizing same to provide a method of intrinsically safely automatically controlling the spool slippage setting of a deepwater umbilical as a blowout preventer stack is lowered on a drilling riser and the radius to the umbilical changes.

Still another object of the present invention is to provide a new and improved reel apparatus, system and method of utilizing same that may intrinsically safely determine the direction of rotation of the spool.

Yet another object of the present invention is to provide a new and improved reel apparatus, system and method of utilizing same that may provide air to increase slippage.

It is a further object of the present invention to provide a new and improved reel apparatus, system and method of utilizing same, which is of a durable and reliable construction and may be utilized in numerous types of reel and or winch applications.

An even further object of the present invention is to provide a new and improved reel apparatus, system and method of utilizing same, which is susceptible to a low cost of manufacture, installation and labor, which accordingly is then susceptible to low prices of sale to the consuming industry, thereby making such a system economically available to those in the field.

Still another object of the present invention is to provide a new and improved reel apparatus, system and method of utilizing same, which provides all of the advantages of the prior art while simultaneously overcoming some of the disadvantages normally associated therewith.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings and appendices.

DETAILED DESCRIPTION OF INVENTION

Figure 1:
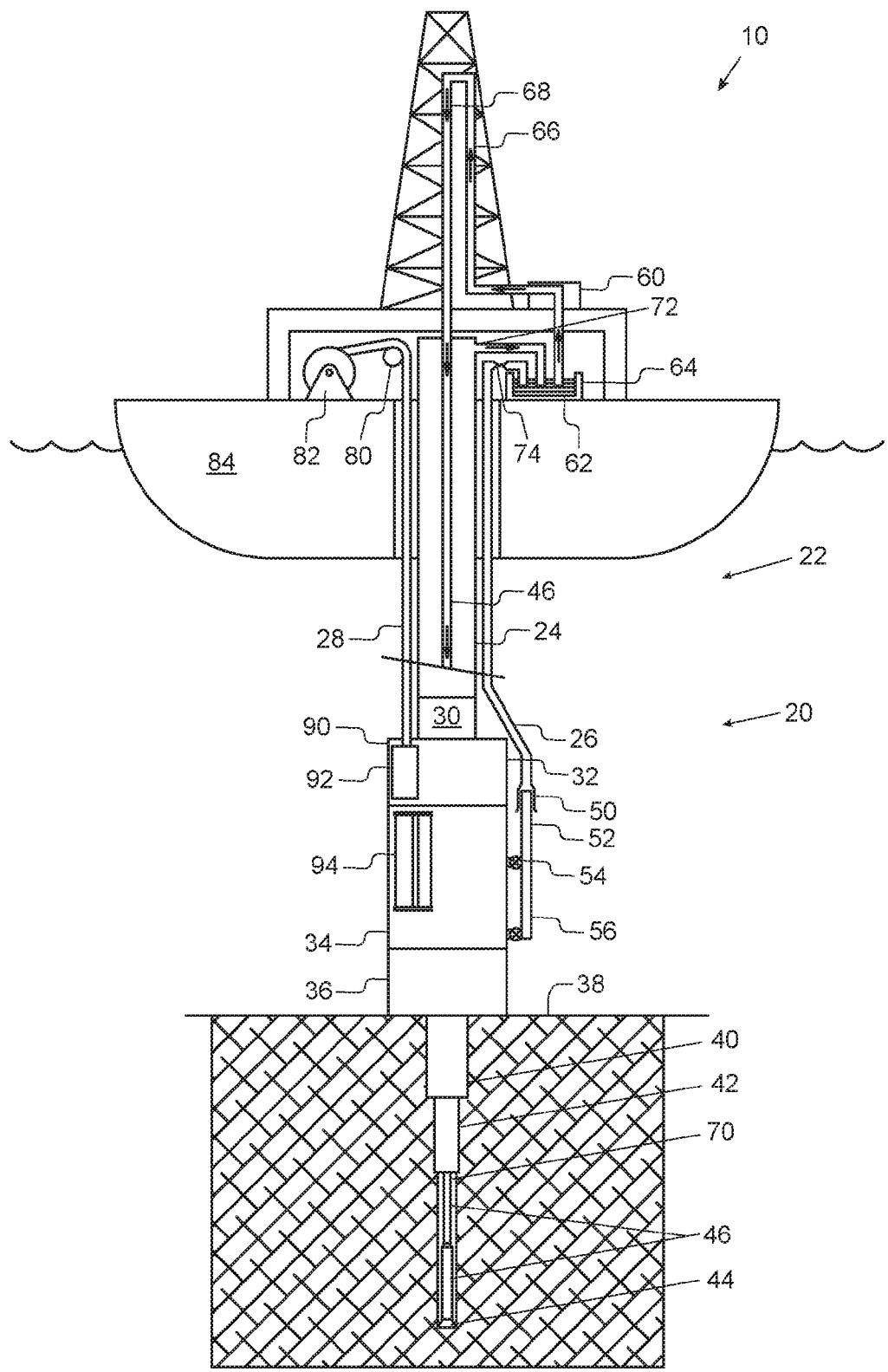
FIG. 1 is a general illustration of a preferred embodiment in accordance with the invention depicting a system of subsea equipment utilizing a reel with the characteristics of this invention.

Referring to the illustrations, drawings and pictures, reference character 10 generally designates a new and improved reel apparatus, system and method of using same that may generally maintain constant tension on a reel umbilical. Invention 10 is generally used with reels and or winches with offshore applications but is to be understood that invention 10 may be utilized for non-offshore applications and may be utilized in other operations with reels and or winches in general. For purposes of convenience, the reference numeral 10 may generally be utilized for the indication of the invention, portion of the invention, preferred embodiments of the invention and so forth.

Referring now to FIG. 1, a view of a complete system for drilling subsea wells 20 is shown in order to illustrate the utility of the present invention. The drilling riser 22 is shown with a central pipe 24, outside fluid lines 26, and umbilical, cable or hose 28.

Below the drilling riser 22 is a flex joint 30, lower marine riser package 32, lower blowout preventer stack 34 and wellhead or wellhead system 36 landed on the seafloor 38.

Below the wellhead 36, it can be seen that a hole was drilled for a first casing string 40, that first casing string 40 was landed and cemented in place, a hole drilled through the first casing string 40 for a second casing string 42, the second casing string 42 cemented in place, and a hole is being drilled for a third casing string by drill bit 44 on drill string 46.

The lower blowout preventer stack 34 generally comprises a lower hydraulic connector for connecting to the subsea wellhead system 36, usually 4 or 5 ram style blowout preventers, an annular preventer, and an upper mandrel for connection by the connector on the lower marine riser package 32, which are not individually shown but are well known in the art.

Below outside fluid line 26 is a choke and kill (C&K) connector 50 and a pipe 52, which is generally illustrative of a choke or kill line. Pipe 52 goes down to valves 54 and 56, which provide flow to or from the central bore of the blowout preventer stack as may be appropriate from time to time. Typically, a kill line will enter the bore of the blowout preventers below the lowest ram and has the general function of pumping heavy fluid to the well to overburden the pressure in the bore or to "kill" the pressure. The general implication of this is that the heavier mud cannot be circulated into the well bore, but rather must be forced into the formations. A choke line will typically enter the well bore above the lowest ram and is generally intended to allow circulation in order to circulate heavier mud into the well to regain pressure control of the well. Normal circulation is down the drill string 46, through the drill bit 44.

In normal drilling circulation, mud pumps 60 take drilling mud 62 from mud tank 64. The drilling mud 60 will be pumped up a standpipe 66 and down upper end 68 of the drill string 46. It will be pumped down the drill string 46, out the drill bit 44, and return up the annular area 70 between the outside of the drill string 46 and the bore of the hole being drilled, up the bore of the second casing string 42, through the subsea wellhead system 36, the lower blowout preventer stack 34, the lower marine riser package 32, up the drilling riser 22, out a bell nipple 72 and back into the mud tank 64.

During situations in which an abnormally high pressure from the formation has entered the well bore, the thin walled central pipe 24 is typically not able to withstand the pressures involved. Rather than making the wall thickness of the relatively large bore drilling riser thick enough to withstand the pressure, the flow is diverted to a choke line or outside fluid line 26. It is more economical to have a relatively thick wall in a small pipe to withstand the higher pressures than to have the proportionately thick wall in the larger riser pipe.

When higher pressures are to be contained, one of the annular or ram blowout preventers are closed around the drill pipe and the flow coming up the annular area 70 around the drill pipe is diverted out through choke valve 54 into the pipe 52. The flow passes up through C&K connector 50, up outside fluid lines 26, which is attached to the outer diameter of the central pipe 24, through choking means illustrated at 74, and back into the mud tank 64.

On the opposite side of the drilling riser 22 is shown cable or hose 28 coming across a sheave 80 from a reel 82 on vessel 84. The cable or hose 28 is shown characteristically entering the top 90 of the lower marine riser package 32. These cables 28 typically carry hydraulic, electrical, multiplex electrical, or fiber optic signals. Typically, there are at least two of these cable 28 systems for redundancy, which are characteristically painted yellow and blue. As the umbilicals 28 enter top 90 of the lower marine riser package 32, they typically enter a control pod 92 to deliver their supply or signals. Hydraulic supply is delivered to one or more dual hydraulic accumulators 94 located on the lower marine riser package 32 or the lower blowout preventer stack 34 to store hydraulic fluid under pressure until needed.

Figure 2:
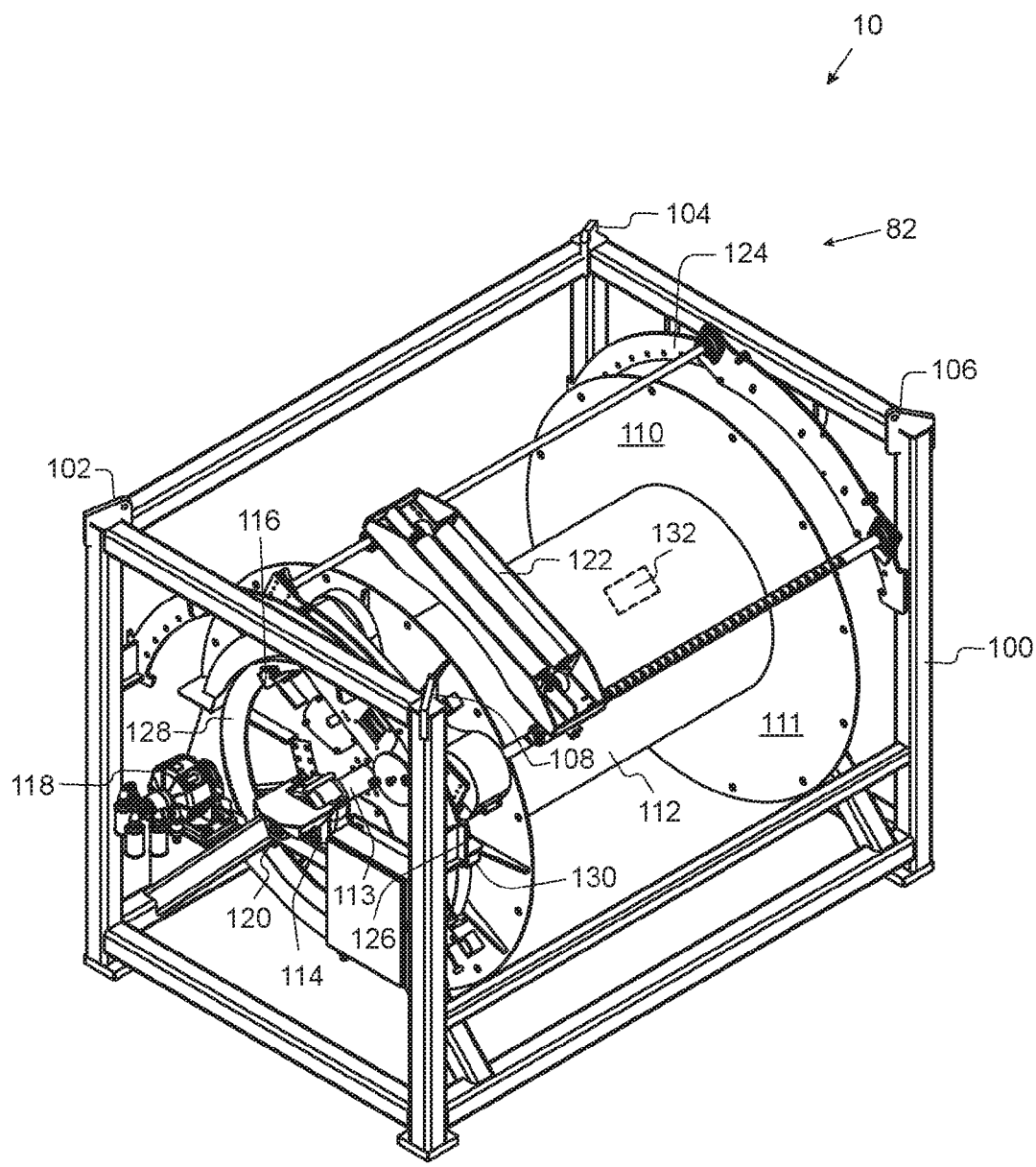
FIG. 2 is a general illustration of a preferred embodiment in accordance with the invention depicting a perspective view of a reel utilizing the features of this invention.

Referring now to FIG. 2, the reel 82 is shown in greater detail. Reel 82 has frame 100, lifting padeyes 102, 104, 106 and 108, spool 110 having flanges 111 and drum 112 mounted on axle 113 and bearing 114, slip clutches 116, motor 118, swivel 120, levelwind assembly 122 mounted on banana shaped mounting 124, control box 126, and gear or sprocket 128. Swivel 120 can be hydraulic, electrical, fiber optic, or a combination of any of these. Gear or sprocket 128 is mounted on slip clutches 116 which are fixed to spool 110.

Also shown on reel 82 are frame control module 130 and spool control module 132 which is shown inside spool 110.

Figure 3:
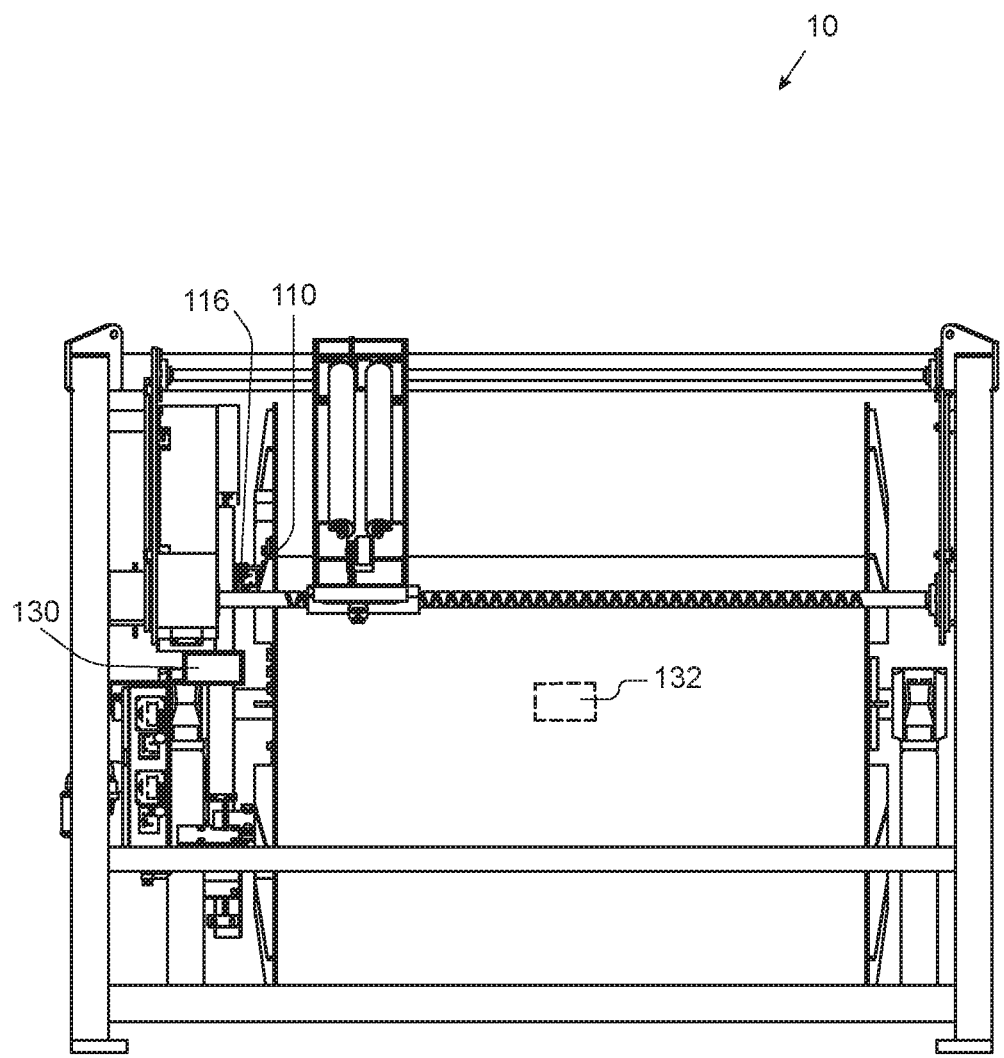
FIG. 3 is a general illustration of a preferred embodiment in accordance with the invention depicting a front view of the reel of FIG. 2.

Referring now to FIG. 3, the relationship of slip clutches 116 and the frame control module 130 is shown such that as spool 110 rotates, each of the slip clutches 116 pass near frame control module 130. As will be discussed later, each time a slip clutch 116 passes the frame control module 130, they will be detected and counted to determine both the number of rotations of the spool 110 and the direction of rotation of the spool 110. In an alternate embodiment, accelerometers on or within spool 110 will provide this capability.

Figure 4:
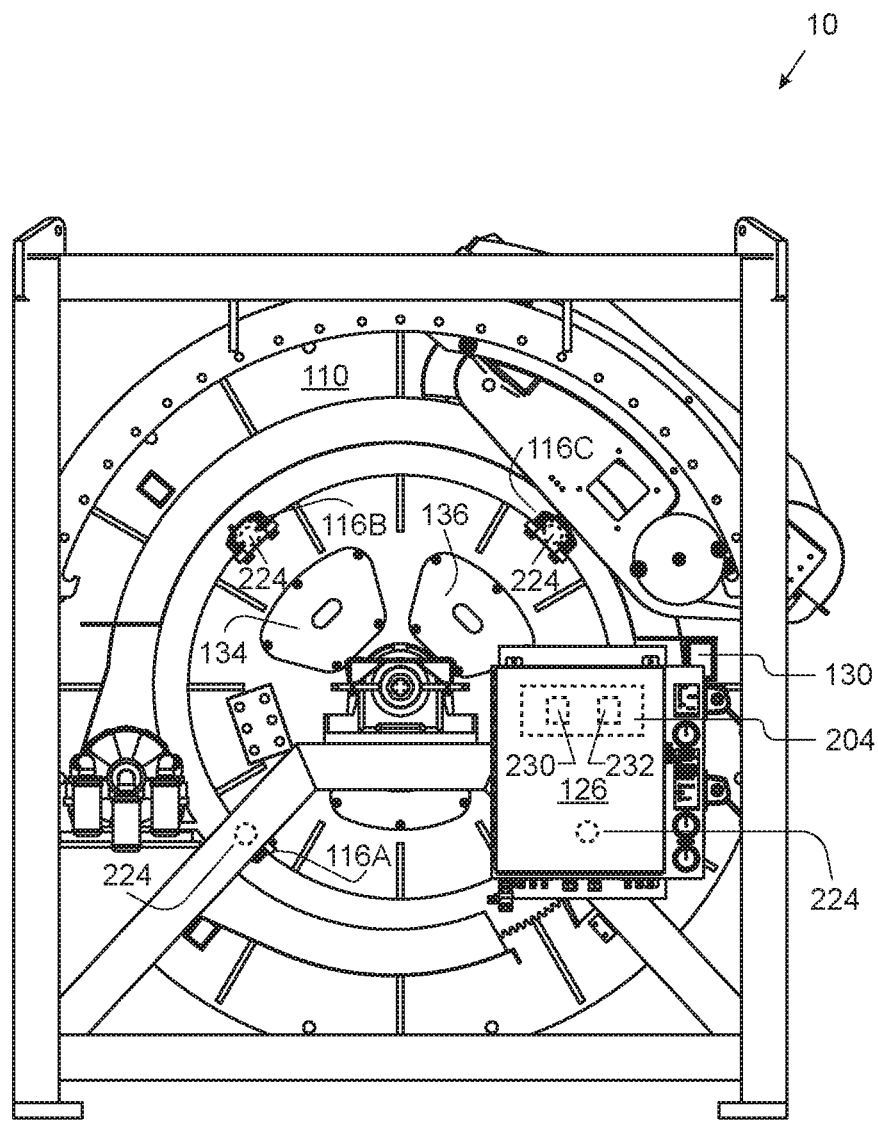
FIG. 4 is a general illustration of a preferred embodiment in accordance with the invention depicting an end view of the reel of FIG. 2.

Referring now to FIG. 4, slip clutches 116A, 116B and 116C are seen, with the fourth slip clutch 116D being hidden behind control box or panel 126. This means that for each rotation of the spool 110, spool control module 132 will see four indications, so will divide the number by 4 to get the actual number of rotations. Access covers 134 and 136 are shown on the end of spool 110. These give access to the inside of the spool 110 to install and service spool control module 132.

Figure 5:
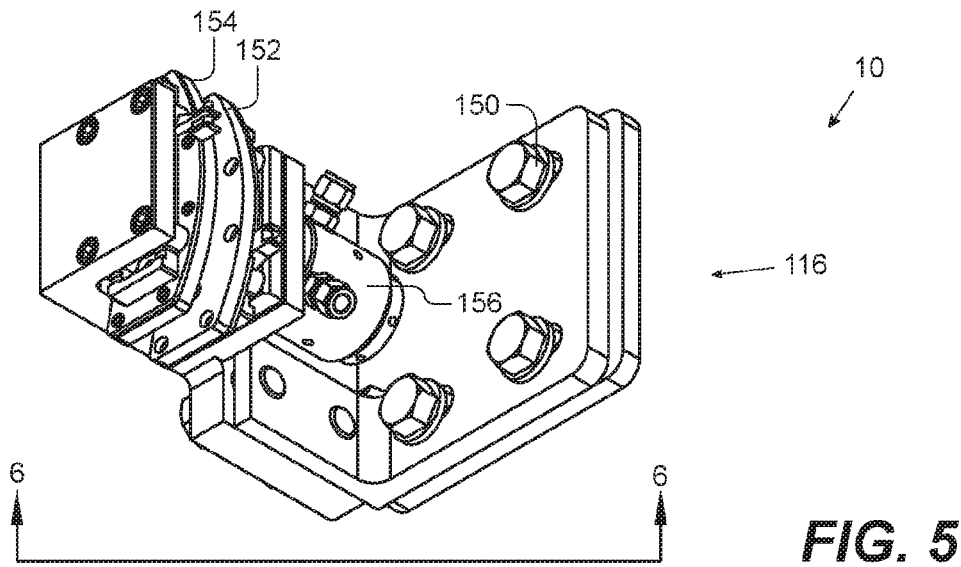
FIG. 5 is a general illustration of a preferred embodiment in accordance with the invention depicting a perspective view of a slip clutch which is utilized in this invention.

Referring now to FIG. 5, a perspective view of one of slip clutches 116 is seen, showing mounting bolts 150 to fix it to the side of spool 110, brake pads 152 and 154 to engage the gear or sprocket 128 and provide a frictional gripping force, and cylinder 156, which provides controlled loading to regulate the frictional slipping load.

Figure 6:
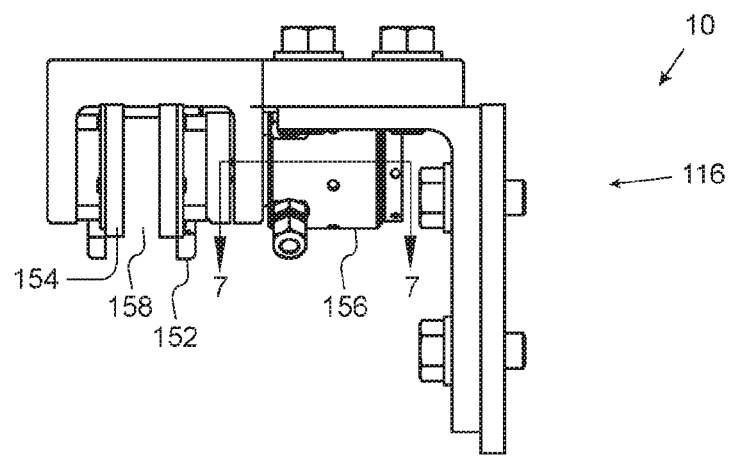
FIG. 6 is a general illustration of a preferred embodiment in accordance with the invention depicting a side view of the slip clutch of FIG. 5 taken generally along section lines "6-6".

Referring now to FIG. 6, a view of slip clutch 116 is shown according to the view "6-6" taken from FIG. 5. Gap 158 is shown between brake pads 152 and 154 for slidable receipt of gear or sprocket 128.

Figure 7:
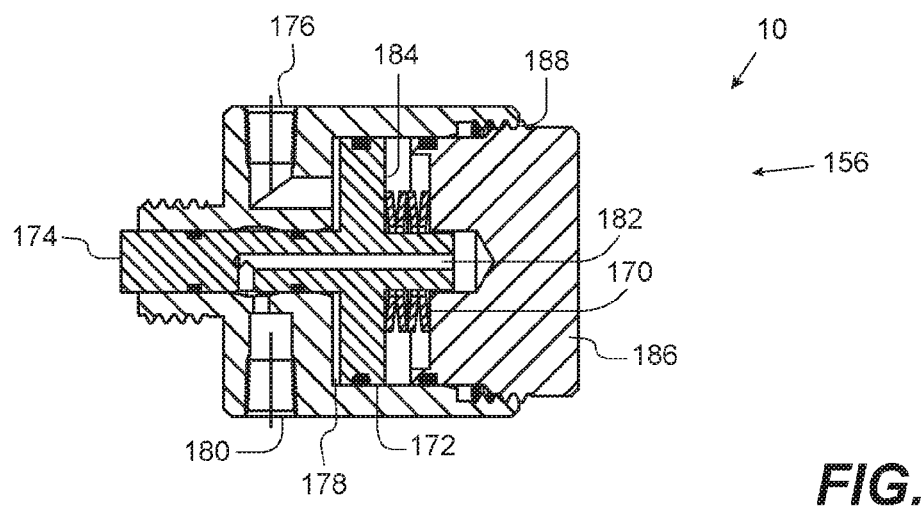
FIG. 7 is a half section of the cylinder portion of the slip clutch taken generally along section lines "7-7".

Referring now to FIG. 7, a half section of cylinder 156 is shown taken from section "7-7" of FIG. 6. Spring washers 170 provide a force against piston 172, which in turn loads brake pad 152 through end 174. Regulated air pressure through port 176 on piston area 178 provides a force to offset the force of spring washers 170, regulating the force on end 174, and therefore, brake pad 152 to adjust the force required to cause gear or sprocket 128 to slip. Regulated air pressure through port 180 and porting 182 in piston 172 act on piston area 184 of piston 172 to be additive to the force of spring washers 170 when greater frictional force is desired. Piston cap 186 is rotated on threads 188 to provide an initial mechanical adjustment to the magnitude of force from spring washers 170.

Figure 8:
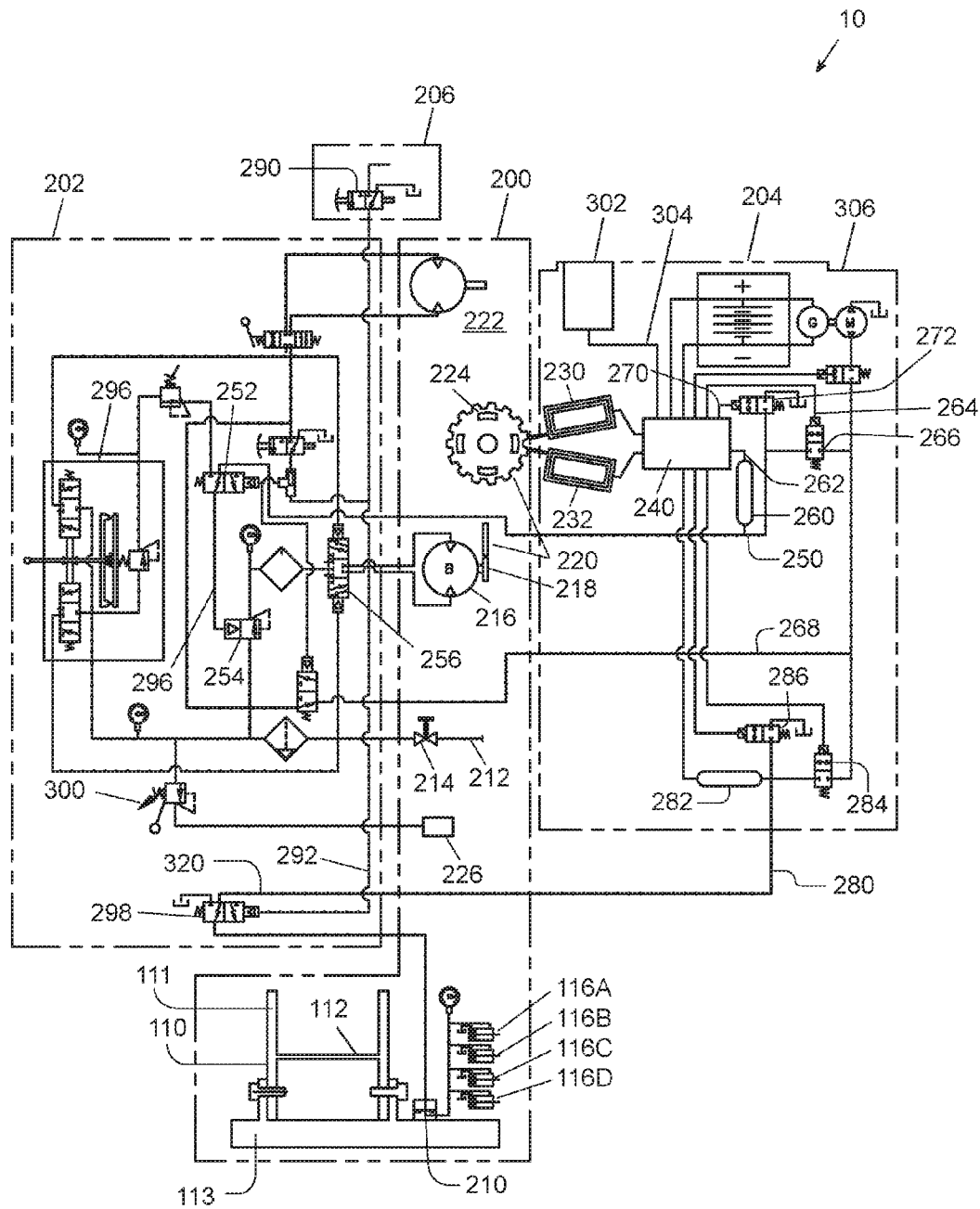
FIG. 8 is a general illustration of a preferred embodiment in accordance with the invention depicting a schematic of the implementation of the present invention utilizing a single computer module.

Referring now to FIG. 8, box 200 generally encompasses the mechanical components of reel 82, box 202 generally encompasses the components of the local control panel 126, box 204 generally encompasses the components of the frame control module 130, and box 206 generally encompasses the components of the driller's control panel.

Box 200 incudes spool 110, axle 113, slip clutches 116A to 116D, air swivel 210, air supply 212, air shutoff valve 214, air motor 216 with gear or sprocket 218 mounted, driven gear or sprocket 220, and levelwind drive motor 222. Driven gear or sprocket 220 is shown aligned with gear or sprocket 218 and is also shown with a face view having four protrusions 224 at 90 degrees. The protrusions 224 are likely a portion of the slip clutches 116 but they can be other quantities and other components. Brakes 226 are shown and will be operated by control box 126.

Box 202 includes the components of a pneumatic control box which would provide constant torque control of a reel, and some components which change it to having constant tension operation, as will be described as follows.

Box 204 is the control box which includes the components which convert the reel to constant tension operation. Proximity sensor(s) or sensing component(s) 230 and 232 can be acoustic, laser, microwave, or other means to detect when the protrusions 224 pass by. Further they are positioned such that both will sense protrusion 224 one after the other, but the second to sense protrusion 224 will also sense before the first stops sensing. Sensing component 230 is the primary sensing component and sensing component 232 is the secondary sensing component. When sensing component 230 first senses one of the protrusions 224, sensing component 232 will be checked to see if it is sensing at the same time. If sensing component 232 is sensing when sensing component 230 starts sensing protrusion 224, it will mean that the reel is rotating in the take-up direction. If sensing component 232 is not sensing when sensing component 230 starts sensing protrusion 224, it will mean that the reel is rotating in the payout direction.

Processing computer 240 is initially set up with inputs on the spool drum diameter, spool width, spool flange diameter, umbilical diameter, the starting dimension from the outer diameter of the spool flange, and the distance from the side of the spool flange to the current umbilical position. The processing computer 240 receives the indications from sensing components 230 and 232, calculates the current wrap of the umbilical on the spool, and determines the appropriate motor air pressure to provide the appropriate torque and the appropriate slip clutch air pressure for port 176 of FIG. 7 to set the appropriate slippage setting. The general goal of these calculations is to end up with a constant tension pull on the umbilical, e.g. 1000 lbs., and an appropriate slippage setting on the spool, e.g. 1,500 lbs. umbilical tension. This umbilical tension setting and slippage setting is to remain relatively constant from a full spool starting the lowering of the blowout preventer stack to its landing on the seafloor and back up to the surface. This not only involves the fact that the motor torque and slippage settings must change each time the umbilical starts on new wrap level, but also that simply reversing the reel has frictional hysteresis assisting you in one direction and working against you in the other direction.

The computed appropriate motor air pressure is sent to the motor along line 250 to selector valve 252, to large bore pressure regulator 254, through large bore selector valve 256, and then to air motor 216. The method of generating the appropriate air motor pressure signals is to measure the pressure in line 250 using pressure transmitter 260 and sending the information back to the processing computer 240 along wire 262. If the air pressure in line 250 is low, processing computer 240 sends a signal through wire 264 to valve 266 to temporarily open the valve and let the higher supply pressure in supply line 268 vent into line 250. If the air pressure in line 250 is low, processing computer 240 sends a signal through wire 270 to valve 272 to temporarily open the valve and vent the pressure in line 250 to reduce the pressure. Processing computer 240 is programmed in a repetitive loop, so it will repeatedly check the pressure in line 250 through pressure transmitter 260, continually making sure the pressure in line 250 is within the required pressure band.

When deploying the umbilical and all the umbilical is deployed for a wrap and the reel starts to deploy from the next lower wrap, the radius is reduced so the spool/motor torque requirement is reduced. At that time the computer 240 computes the lower pressure required for line 250 and begins pulsing valve 272 until the pressure is in the proper range. Alternately, when recovering the umbilical as the blowout preventer stack returns to the surface and the umbilical begins wrapping on the next higher layer, the computer 240 begins pulsing valve 266 to increase the pressure in line 250 to the required computed level.

Similarly a signal is calculated by processing computer 240 and built in line 280 for slip clutches 116A, 116B, 116C and 116D using pressure transmitter 282, valve 284 to increase the pressure, and valve 286 to reduce the pressure. In this case the signal in line 280 is communicated to the slip clutches 116A, 116B, 116C and 116D through air swivel 210. Air swivel 210 can be made integrally with the axle 113 or can be a slip on air swivel 210 as is illustrated in FIG. 8.

Box 206 shows a single valve 290, which is mounted in a remote location such as the driller's control house. Valve 290 is a two position detented valve and in the present position, the pressure in line 292 is simply vented. This means that the air signal in line 250 will be communicated through valve 252 to regulator 254 and sets the pressure on the motor as determined by the processing computer 240. Similarly, the air signal in line 280 will be communicated through valve 298 to the slip clutches 116A, 116B, 116C and 116D as determined by the processing computer 240. When valve 290 is moved to the alternated detent position, higher pressure air supply from line 294 is introduced into line 292 shifting valve 252 to allow the pressure from the manual throttle 296 to control the motor pressure and shifting valve 298 to vent the air pressure from the slip clutches 116A, 116B, 116C and 116D. This returns the reel to what is known as constant torque control, or a reel which simply maintains the present spool torque until the throttle is changed and has no adjustment on the slip clutch settings. Valve 300 is the brake control valve.

Infrared port 302 is used to refresh the computer program in process computer 240 through line 304 when an upload module as will be described later is engaged with profile 306 for proper alignment.

Figure 9:
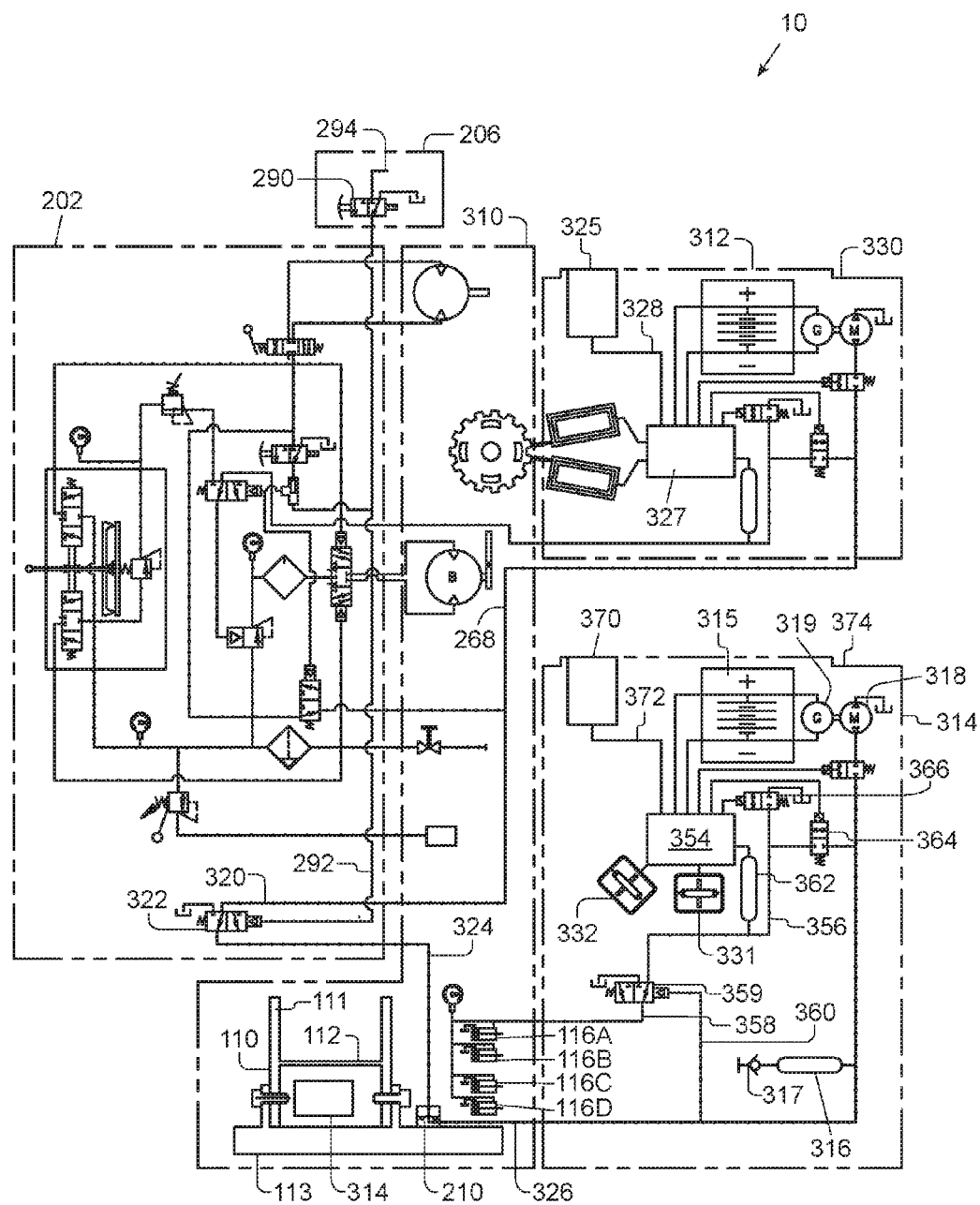
FIG. 9 is a general illustration of a preferred embodiment in accordance with the invention depicting a schematic of the implementation of the present invention utilizing a stationary computer module on the frame and a rotating computer module in the spool.

Referring now to FIG. 9, a schematic similar to FIG. 8 is illustrated, with boxes 202 and 204 being identical. Reel box 200 is replaced with reel box 310 and box 204 is replaced with box 312 and box 314.

Box 314 is also shown to be located inside spool 110 as shown in box 310 rather than on the frame as box 312 and box 204 are. Whereas box 204 provided a single processing computer 240 to control both the motor pressure and the slip clutch pressure, in this configuration box 312 controls the motor pressure and box 314 controls the slip clutch pressure. One effect of this is that the signal is going through the swivel in the opposite direction, and another is that you no longer need a swivel if you make battery pack 315 within box 314 large enough to run several trips to the seafloor or sufficient air supply can be supplied in air tank 316 through connector 317 or air swivel 210 to power air motor 318, which drives generator 319 to keep the battery pack 315 charged.

Box 310 shows that the air supply line 268 is taken by air line 320, through valve 322, line 324 and exits from the air swivel 210 as air line 326, which goes to power the box 314. Whenever the valve 290 in box 206 is actuated and applies pressure to line 292, valve 322 is shifted and the pressure in lines 324 and 326 is dumped returning the slip clutches to the default constant torque (non-adjustable) mode.

Box 312 includes all the components of box 204 of FIG. 8 except the components 280, 282, 284 and 286, which were used to control the setting on slip clutches 116A, 116B, 116C and 116D, which are included in box 314.

Infrared port 325 is used to refresh the computer program in process computer 327 through line 328 when an upload module as will be described later in engaged with profile 330 for proper alignment.

Box 314 is located within the spool 110 (as shown in box 310), it does not have the reference information which box 204 provided. Accelerometers 350 and 352 are provided to detect rotations and rotational direction as will be described later. As was done in FIG. 8, this will be used to determine whether the umbilical is going to the next outer or the next inner wrap when it reaches either of the side flanges on the spool.

The computation of the needed slip clutch pressure is done in process computer 354 and sent to the slip clutches 116A, 116B, 116C and 116D along lines 356 and 358. Valve 359 is provided between lines 356 and 358 and is opened by pressure from the supply air line 326 along line 360 to allow the computed signal to pass. If the supply pressure is reduced to zero, the supply signal in line 360 is vented and the reel returns to constant torque operation.

A signal is calculated by processing computer 354 and built in line 356 for slip clutches 116A, 116B, 116C and 116D using pressure transmitter 362, valve 364 to increase the pressure, and valve 366 to reduce the pressure, similarly as pressure transmitter 282, valve 284, and valve 286 were used in FIG. 8.

Infrared port 370 is used to refresh the computer program in process computer 354 through line 372 when an upload module as will be described later is engaged with profile 374 for proper alignment.

Figure 10:
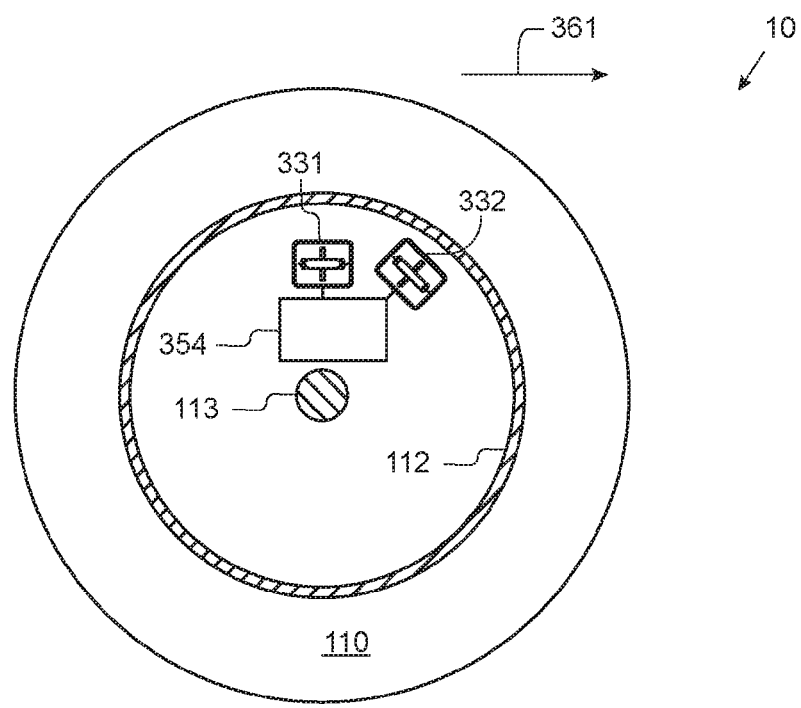
FIG. 10 is a general illustration of a preferred embodiment in accordance with the invention depicting an independent module utilized to update the modules of the schematics in FIGS. 8 and 9.

Referring now to FIG. 10, in one full rotation of spool 110, the accelerometers will see plus one g's and minus one g's and can count the g cycles as rotations. When primary accelerometer 331 is at one-g displaced as shown, secondary accelerometer 332 can be positioned at 45 degrees as shown towards the payout direction 361. This angle is an example, the actual angle can be any angle other than 0 degrees, 90 degrees, 180 degrees, or 270 degrees. When the primary accelerometer 331 is at zero-g's, whether the secondary accelerometer 332 is reading plus one or minus one-g's will tell the direction of rotation. In this case, if the g-readings are declining it will mean that the spool 110 is rotating in the payout direction. If the g-readings are increasing it will mean that the spool 110 is rotating in the take-up direction. This information can be fed back into the process computer 354 to determine when the umbilical comes to the end of a wrapping a layer whether to add to the radius to the umbilical or to subtract from it.

Figure 11:
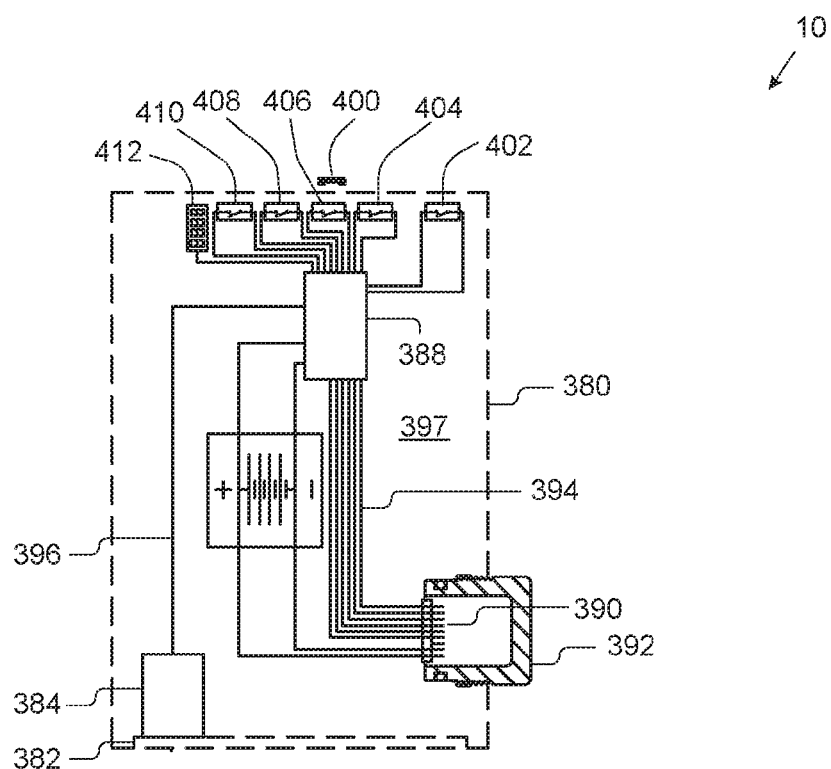
FIG. 11 is a general illustration of a preferred embodiment in accordance with the invention depicting a schematic of the implementation of the present invention.

Referring now to FIG. 11, an upload module 380 which as a profile 382 for convenient engagement and alignment with profiles 306, 330, and 374 when process computers 240, 327, or 354 need to be initially programmed or refreshed. Infrared transmitter 384 engages infrared port 302, 325, or 370 for initially programming or refreshing the appropriate process computers. Process computer 388 is uploaded from a standard computer through a USB or other port 390 which is made explosion proof by an appropriate cap protector 392. Lines 394 connect the port 390 to process computer 388 and line 396 in turn connects process computer 388 to the infrared port 384.

When upload module 380 is taken to refresh a process computer on the reel, it will often be in the hazardous explosion prone area of an offshore drilling rig. For this reason all modules used need to be explosion proof. In this case the switches required to operate the upload models are magnetic switches buried in solid potting material 397. The other modules described before will likely be of the same construction. Magnet 400 is used to operate the switches with functions such as off and on 402, enter, upload in upload mode 404 or download in download mode 406, increase reading 408, and decrease reading 410. Readout 412 will display the readings of the current mode being adjusted. Likely only the off and on, upload, and download buttons will be used and most programming will simply be input through port 390.

Invention 10, therefore, contemplates a reel assembly for an offshore umbilical comprising a frame having an axle; a spool having flanges and a drum wherein said spool is mounted on said axle and adapted to hold said offshore umbilical; a motor in communication with said spool and adapted to rotate said spool; a tensioning device adapted to automatically maintain a relatively constant tension and a relatively constant slippage load on said umbilical when deployed from said spool; and a processing computer in communication with said tensioning device and said motor wherein said processing computer is adapted to compute said relative constant tension and said relative constant slippage and control said motor.

Invention 10 also therefore contemplates a reel assembly for an offshore umbilical wherein said tensioning device includes at least one slip clutch attached to said frame, adapted to engage said spool, and in communication with said processing computer; wherein said tensioning device includes at least two proximity sensors attached to said spool, adapted to detect rotational direction of said spool, and in communication with said processing computer; wherein said tensioning device includes at least two accelerometers attached to said spool, adapted to detect rotational direction of said spool; and in communication with said processing computer; and may further include a computer upload module in wireless communication with said processing computer.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Changes may be made in the combinations, operations, and arrangements of the various parts and elements described herein without departing from the spirit and scope of the invention. Furthermore, names, titles, headings and general division of the aforementioned are provided for convenience and therefore, should not be considered limiting.

What is claimed is:

1. A reel assembly for an offshore umbilical comprising:

a frame having an axle;

a spool having flanges and a drum wherein said spool is mounted on said axle and adapted to hold said offshore umbilical;

a motor in communication with said spool and adapted to rotate said spool;

a tensioning device adapted to automatically maintain a relatively constant tension and a relatively constant slippage load on said umbilical when deployed from said spool and said tensioning device includes a primary accelerometer attached to said spool and adapted to independently detect rotational direction of said spool and a secondary accelerometer attached to said spool at an angle from said primary accelerometer and adapted to independently detect rotational direction of said spool; and a processing computer in communication with said primary accelerometer, said secondary accelerometer and said motor wherein said processing computer is adapted to compute said relative constant tension and said relative constant slippage and control said motor by measuring the g force difference between said primary accelerometer and said secondary accelerometer.

2. The reel assembly of claim 1 wherein said tensioning device includes at least one slip clutch attached to said frame, adapted to engage said spool, and in communication with said processing computer.

3. The reel assembly of claim 1 further including a computer module in wireless communication with said processing computer.

* * * * *